United States Patent
Kambara et al.

(10) Patent No.: US 11,946,513 B1
(45) Date of Patent: Apr. 2, 2024

(54) CLUTCH DEVICE AND MOTORCYCLE

(71) Applicant: Kabushiki Kaisha F.C.C., Hamamatsu (JP)

(72) Inventors: Makoto Kambara, Hamamatsu (JP); Jun Komukai, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/367,010

(22) Filed: Sep. 12, 2023

(30) Foreign Application Priority Data

Sep. 13, 2022 (JP) ................................ 2022-145633

(51) Int. Cl.
F16D 13/56 (2006.01)
F16D 13/74 (2006.01)

(52) U.S. Cl.
CPC ............. F16D 13/56 (2013.01); F16D 13/74 (2013.01); F16D 2013/565 (2013.01)

(58) Field of Classification Search
CPC .......... F16D 13/56; F16D 13/74; F16D 13/70; F16D 13/52; F16D 2013/565; F16D 23/12; F16D 2023/123
See application file for complete search history.

(56) References Cited

U.S. PATENT DOCUMENTS

| 2011/0192699 | A1  | 8/2011  | Yazaki et al. |
| 2016/0091031 | A1  | 3/2016  | Nakano |
| 2017/0051800 | A1* | 2/2017  | Hill .......................... F16D 13/72 |
| 2017/0211633 | A1* | 7/2017  | Tabuchi ................... F16D 13/62 |
| 2018/0180113 | A1* | 6/2018  | Tokito ................... F16H 57/0427 |
| 2019/0257369 | A1  | 8/2019  | Tabinoki |
| 2020/0158194 | A1  | 5/2020  | Kataoka et al. |
| 2021/0164524 | A1* | 6/2021  | Kitazawa .............. F16D 13/752 |

FOREIGN PATENT DOCUMENTS

| JP | 2011-163425 A | 8/2011 |
| JP | 2016-065606 A | 4/2016 |
| JP | 2019-143689 A | 8/2019 |
| JP | 2019-158017 A | 9/2019 |
| JP | 6894792 B2 | 6/2021 |

OTHER PUBLICATIONS

Official Communication issued in Japanese Patent Application No. 2022-145633, dated Dec. 20, 2022.
Official Communication issued in Japanese Patent Application No. 2022-145633, dated May 16, 2023.
Kambara et al., "Clutch Device and Motorcycle", U.S. Appl. No. 18/367,012, filed Sep. 12, 2023.

* cited by examiner

Primary Examiner — Lori Wu
(74) Attorney, Agent, or Firm — Keating & Bennett, LLP

(57) ABSTRACT

A clutch device includes a clutch center, and a pressure plate movable toward or away from the clutch center, rotatable relative to the clutch center, and operable to press input-side rotating plates and output-side rotating plates. The clutch center includes center-side fitting teeth holding the input-side rotating plates and the output-side rotating plates, projecting radially outward from an outer peripheral surface of an outer peripheral wall, and arranged in circumferential directions, and an oil channel in an end portion of at least one of the center-side fitting teeth in a second direction. The oil channel allows clutch oil flowing at least at an inner peripheral surface of the outer peripheral wall to be discharged to outside of the clutch center.

8 Claims, 11 Drawing Sheets

CLUTCH DEVICE AND MOTORCYCLE

CROSS REFERENCE TO RELATED APPLICATIONS

This application claims the benefit of priority to Japanese Patent Application No. 2022-145633 filed on Sep. 13, 2022. The entire contents of this application are hereby incorporated herein by reference.

BACKGROUND OF THE INVENTION

1. Field of the Invention

The present disclosure relates to a clutch device and a motorcycle. More particularly, the present disclosure relates to a clutch device that arbitrarily allows or interrupts transfer of a rotation driving force of an input shaft that is rotationally driven by a prime mover such as an engine to an output shaft, and also relates to a motorcycle including the clutch device.

2. Description of the Related Art

Conventional vehicles such as motorcycles include clutch devices. A clutch device is disposed between an engine and a drive wheel and allows or interrupts transfer of a rotation driving force of the engine to the drive wheel. The clutch device generally includes a plurality of input-side rotating plates that rotate by a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 6894972, for example, discloses a clutch device including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device employs an assembly of the clutch center and the pressure plate.

In the clutch device of Japanese Patent No. 6894972, for example, as portions holding the output-side rotating plates, the clutch center includes center-side fitting teeth (outer peripheral wall including splines), and the pressure plate includes pressure-side fitting teeth. In a state where the clutch center and the pressure plate are assembled, the center-side fitting teeth and the pressure-side fitting teeth overlap with each other in the radial directions.

Clutch oil that has flowed from the output shaft is distributed in the clutch center. A portion of the clutch oil flows to the outside of the clutch center through a gap between the clutch center and the pressure plate. In the outside of the clutch center, the input-side rotating plates and the output-side rotating plates held by the center-side fitting teeth are disposed. Thus, it is desired that clutch oil efficiently flows from the inside of the clutch center to be supplied to the input-side rotating plates and the output-side rotating plates.

SUMMARY OF THE INVENTION

Preferred embodiments of the present disclosure provide clutch devices each capable of causing clutch oil to flow efficiently from an inside to an outside of a clutch center to supply clutch oil to input-side rotating plates and output-side rotating plates, and motorcycles including such clutch devices.

A clutch device according to a preferred embodiment of the present disclosure is a clutch device to allow or interrupt transfer of a rotation driving force of an input shaft, and includes a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged, and a pressure plate movable toward or away from the clutch center and rotatable relative to the clutch center, the pressure plate being operable to press the input-side rotating plates and the output-side rotating plates, wherein the clutch center includes an output shaft holding portion to which the output shaft is coupled, an outer peripheral wall located radially outward of the output shaft holding portion, a plurality of center-side fitting teeth holding the output-side rotating plates, projecting radially outward from an outer peripheral surface of the outer peripheral wall, and arranged in circumferential directions, and an oil channel located in an end portion of at least one of the center-side fitting teeth in a second direction, a direction in which the pressure plate moves toward the clutch center being a first direction, a direction in which the pressure plate moves away from the clutch center being the second direction, and the oil channel allows clutch oil flowing at least at an inner peripheral surface of the outer peripheral wall to be discharged to outside of the clutch center.

In a clutch device according to a preferred embodiment of the present disclosure, the oil channel of the clutch center is located in an end portion of at least one of the center-side fitting teeth in the second direction, and clutch oil flowing at least at the inner peripheral surface of the outer peripheral wall is discharged to the outside of the clutch center. Accordingly, a larger amount of clutch oil flowing between the clutch center and the pressure plate flows to the outside of the clutch center through the oil channels. That is, since a larger amount of clutch oil flows from the inside of the clutch center, clutch oil can be efficiently supplied to the input-side rotating plates and the output-side rotating plates located outward of the center-side fitting teeth.

In another clutch device according to the present disclosure is a clutch device to allow or interrupt transfer of a rotation driving force of an input shaft to an output shaft and includes a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged, and a pressure plate movable toward or away from the clutch center and rotatable relative to the clutch center, the pressure plate being operable to press the input-side rotating plates and the output-side rotating plates, wherein the clutch center includes an output shaft holding portion to which the output shaft is coupled, an outer peripheral wall located radially outward of the output shaft holding portion, a plurality of center-side fitting teeth holding the output-side rotating plates, projecting radially outward from an outer peripheral surface of the outer peripheral wall, and arranged in circumferential directions, and a recess that is recessed in a first direction from an end surface of at least one of the center-side fitting teeth in a second direction, a direction in which the pressure plate moves toward the clutch center being a first direction, a direction in which the pressure plate moves away from the clutch center being the second direction, and the recess is open toward an inner peripheral surface and an outer peripheral surface of the outer peripheral wall.

In this clutch device according to a preferred embodiment of the present disclosure, the clutch center includes the recess that is recessed in the first direction from an end surface of at least one of the center-side fitting teeth in the second direction, and the recess is open toward the inner peripheral surface and the outer peripheral surface of the outer peripheral wall. Accordingly, while the clutch center rotates, for example, clutch oil flowing at the inner peripheral surface of the outer peripheral wall can flow toward the outer peripheral surface through the recess, and clutch oil can be efficiently supplied to the input-side rotating plates and the output-side rotating plates located outward of the center-side fitting teeth, for example.

Preferred embodiments of the present invention provide clutch devices each capable of causing clutch oil to flow efficiently from the inside to outside of a clutch center to supply clutch oil to input-side rotating plates and output-side rotating plates.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
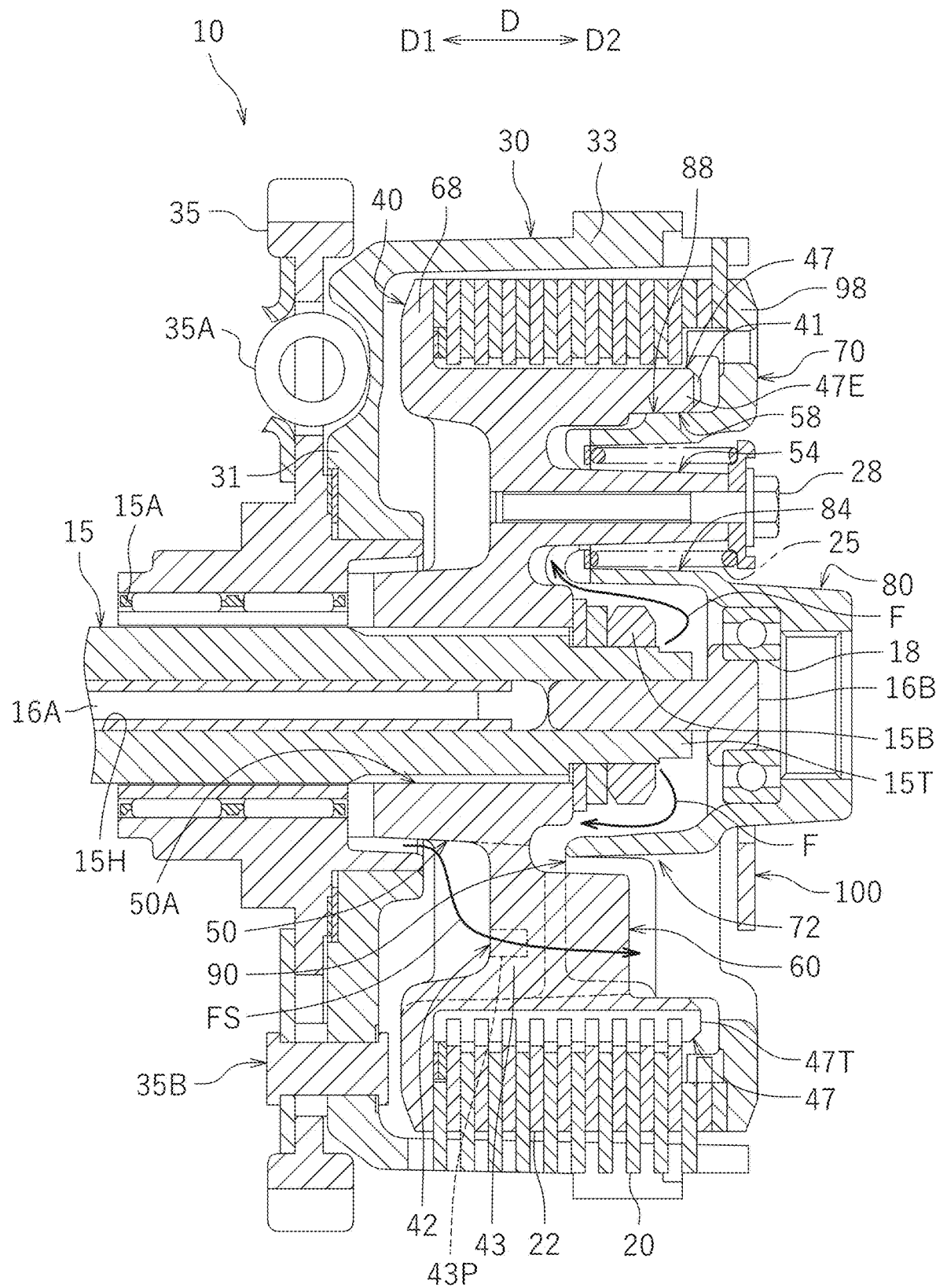
FIG. 1 is a cross-sectional view of a clutch device according to a first preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

FIG. 1 is a cross-sectional view of a clutch device 10 according to this preferred embodiment. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is disposed between the engine and a transmission.

In the following description, directions in which a pressure plate 70 of the clutch device 10 and the clutch center 40 are arranged will be referred to as directions D, a direction in which the pressure plate 70 moves toward the clutch center 40 will be referred to as a first direction D1, and a direction in which the pressure plate 70 moves away from the clutch center 40 will be referred to as a second direction D2. Circumferential directions of the clutch center 40 and the pressure plate 70 will be referred to as circumferential directions S, one of the circumferential direction S from one pressure-side cam portion 90 to another pressure-side cam portion 90 will be referred to as a first circumferential direction S1 (see FIG. 5), and one of the circumferential direction S from the other pressure-side cam portion 90 to the one pressure-side cam portion 90 will be referred to as a second circumferential direction S2 (see FIG. 5). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1. It should be noted that the directions described above are defined simply for convenience of description, and are not intended to limit the state of installation of the clutch device 10 and do not limit the present disclosure.

As illustrated in FIG. 1, the output shaft 15 is a hollow shaft. One end of the output shaft 15 rotatably supports an input gear 35 described later and the clutch housing 30 through a needle bearing 15A. The output shaft 15 fixedly supports a clutch center 40 through a nut 15B. That is, the output shaft 15 rotates together with the clutch center 40. The other end of the output shaft 15 is coupled to a transmission (not shown) of an automobile, for example.

As illustrated in FIG. 1, the output shaft 15 includes, in a hollow portion 15H thereof, a push rod 16A and a push member 16B adjacent to the push rod 16A. The hollow portion 15H defines and functions as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in the drawing) coupled to a clutch operation lever (not shown) of the motorcycle, and slides in the hollow portion 15H by operation of the clutch operation lever and presses the clutch push member 16B in the second direction D2. A portion of the push member 16B projects outward of the output shaft 15 (in the second direction D2 in this preferred embodiment) and is coupled to a release bearing 18 provided on the pressure plate 70. The push rod 16A and the push member 16B are thinner than the inner diameter of the hollow portion 15H so that flowability of clutch oil is obtained in the hollow portion 15H.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the second direction D2. The clutch housing 30 holds the plurality of input-side rotating plates 20.

As illustrated in FIG. 1, an input gear 35 is disposed on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 are rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers, for example, is located between the friction members to hold clutch oil.

As illustrated in FIG. 1, the clutch center 40 is housed in the clutch housing 30. The clutch center 40 and the clutch housing 30 are concentrically disposed. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
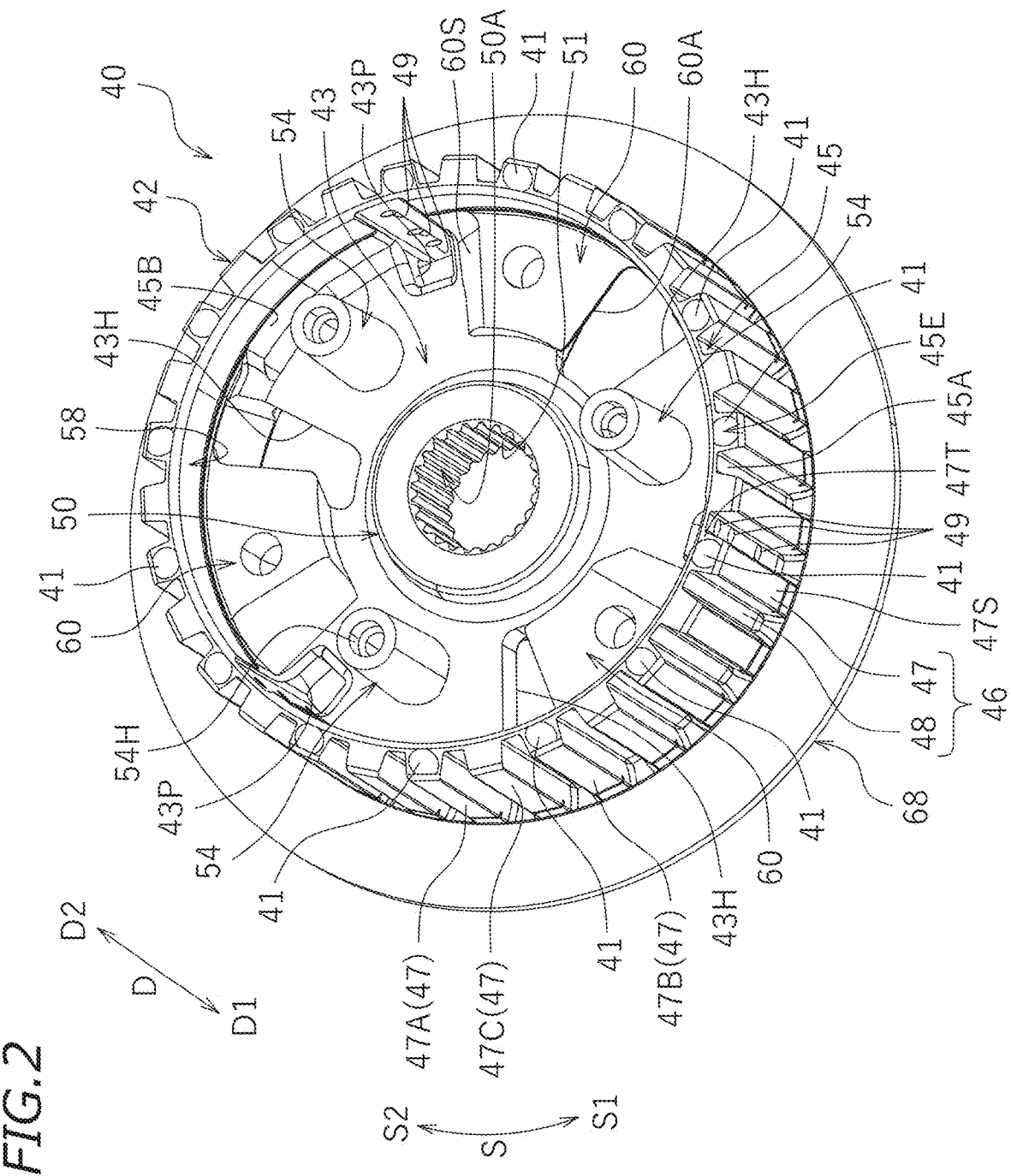
FIG. 2 is a perspective view of a clutch center according to the first preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 disposed at the center of the base wall 43, a plurality of center-side cam portions 60 connected to the base wall 43 and the outer peripheral wall 45, and a center-side fitting portion 58.

The output shaft holding portion 50 has a cylindrical shape. The output shaft holding portion 50 has an insertion hole 51 in which the output shaft 15 is inserted and spline-fitted. The insertion hole 51 penetrates the base wall 43. An inner peripheral surface 50A of the output shaft holding portion 50 defining the insertion hole 51 includes a plurality of spline grooves arranged along the axial direction. The output shaft 15 is coupled to the output shaft holding portion 50.

As illustrated in FIG. 2, the outer peripheral wall 45 of the clutch center 40 is disposed radially outward of the output shaft holding portion 50. An outer peripheral surface 45A of the outer peripheral wall 45 includes a spline fitting portion 46. The spline fitting portion 46 includes a plurality of center-side fitting teeth 47 extending in the axial directions of the clutch center 40 along the outer peripheral surface 45A of the outer peripheral wall 45, a plurality of spline grooves 48 each located between adjacent ones of the center-side fitting teeth 47 and extending in the axial directions of the clutch center 40, and oil flow holes 49. The center-side fitting teeth 47 hold the output-side rotating plates 22. The plurality of center-side fitting teeth 47 arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface 45A of the outer peripheral wall 45. The number of the center-side fitting teeth 47 is preferably a multiple of the number of the center-side cam portions 60. In this preferred embodiment, for example, the number of the center-side cam portions 60 is three, and the number of the center-side fitting teeth 47 is 30, which will be described later. The number of the center-side fitting teeth 47 may not be a multiple of the number of the center-side cam portions 60. The oil flow holes 49 penetrate the outer peripheral wall 45 along the radial directions. Each of the oil flow holes 49 is located between adjacent ones of the center-side fitting teeth 47. That is, the oil flow holes 49 are located in the spline grooves 48. The oil flow holes 49 are located at the sides of the center-side cam portions 60. More specifically, the discharge holes 49 are located at the sides of the center-side slipper cam surfaces 60S of the center-side cam portions 60. The oil flow holes 49 are located ahead of the center-side slipper cam surface 60S in the first circumferential direction S1. The oil flow holes 49 are located ahead of bosses 54 described later in the second circumferential direction S2. In this preferred embodiment, three oil flow holes 49 are provided in each of three portions of the outer peripheral wall 45 in the circumferential directions S. The oil flow holes 49 are arranged at regular or substantially regular intervals in the circumferential directions S. The oil flow holes 49 cause the inside and outside of the clutch center 40 to communicate with each other. The oil flow holes 49 allow clutch oil that has flowed from the output shaft 15 into the clutch center 40 to be discharged to the outside of the clutch center 40. In this preferred embodiment, the oil flow holes 49 allow clutch oil flowing at an inner peripheral surface 45B of the outer peripheral wall 45 to be discharged to the outside of the clutch center 40. At least a portion of the oil flow holes 49 is located at a position facing a pressure-side fitting portion 88 described later.

Figure 3A:
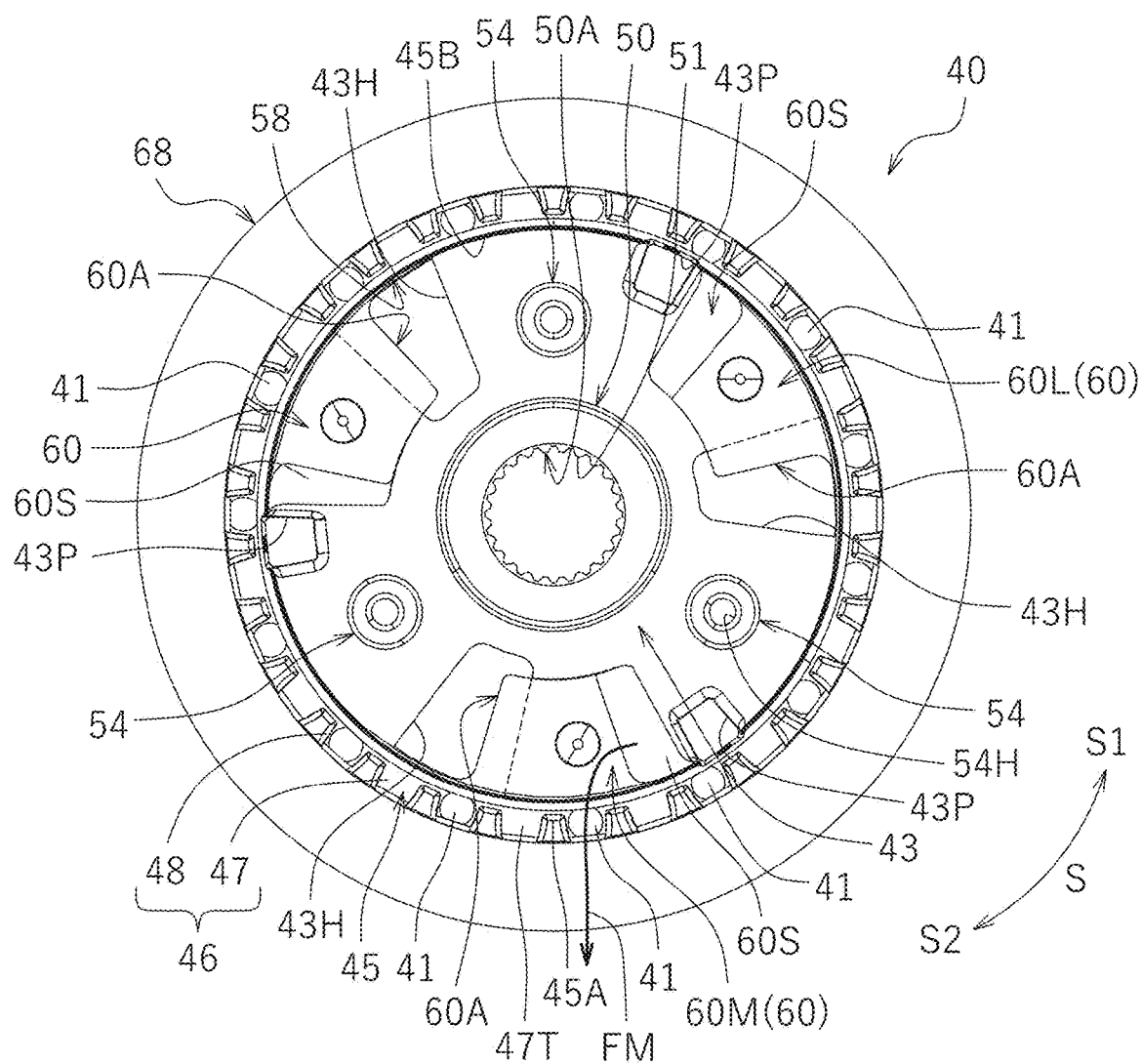
FIG. 3A is a plan view of a clutch center according to the first preferred embodiment of the present invention.
Figure 3B:
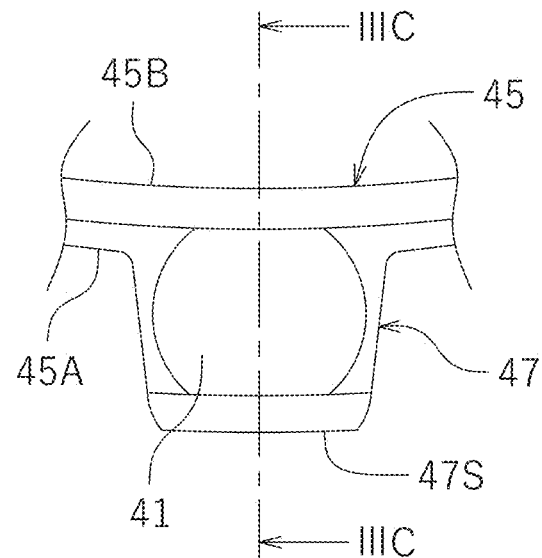
FIG. 3B is an enlarged plan view of an oil channel according to a preferred embodiment of the present invention and its peripheral structure.
Figure 3C:
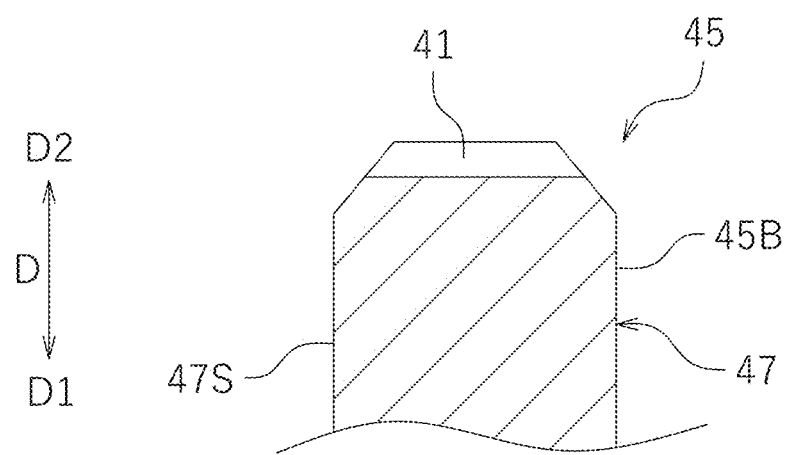
FIG. 3C is a cross-sectional view taken along IIIC-IIIC in FIG. 3B.
Figure 10:
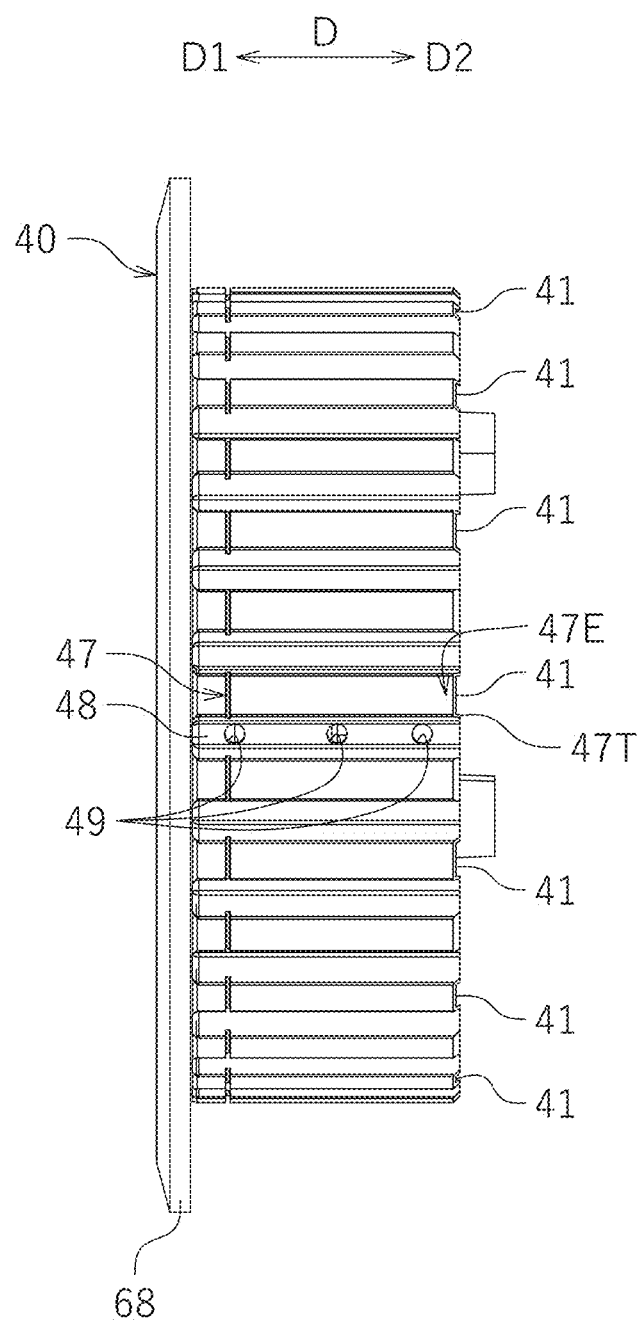
FIG. 10 is a side view of a clutch center according to a preferred embodiment of the present invention.

As illustrated in FIG. 2, the clutch center 40 includes a plurality of oil channels 41 located in the center-side fitting teeth 47. As illustrated in FIG. 10, the oil channels 41 are located in end portions 47E of the center-side fitting teeth 47 in the second direction D2. The oil channels 41 are open toward the outer peripheral surface 45A and the inner peripheral surface 45B of the outer peripheral wall 45. The oil channels 41 cause the outer peripheral surface 45A and the inner peripheral surface 45B of the outer peripheral wall 45 to communicate with each other. The oil channels 41 cause clutch oil flowing at least at the inner peripheral surface 45B of the outer peripheral wall 45 to be discharged to the outside of the clutch center 40. In this preferred embodiment, the oil channels 41 are recessed grooves that are recessed in the first direction D1 from end surfaces 47T of the center-side fitting teeth 47 in the second direction D2 (see also FIG. 3C). The oil channels 41 are an example of a recess. As illustrated in FIG. 3A, each of the oil channels 41 has a substantially circular shape (see also FIG. 3B). The shape of each oil channel 41 is not particularly limited. A portion of the oil channels 41 is located radially outward of the center-side cam portions 60 described later. A portion of the oil channels 41 is located radially outward of center-side cam holes 43H described later. A portion of the oil channels 41 is located radially outward of through holes 43P. The oil channels 41 are located at positions facing the pressure-side fitting portion 88 (see FIG. 4) described later of the pressure plate 70. As illustrated in FIG. 2, a center-side fitting tooth 47C including no oil channels 41 is disposed between one center-side fitting tooth 47A including the oil channel 41 and another center-side fitting tooth 47B including the oil channel 41. In this preferred embodiment, the oil channel 41 is provided in every other one of the center-side fitting teeth 47 arranged in the circumferential directions S, but the oil channel 41 may be provided in every two of the center-side fitting teeth 47 or in every three or more of the center-side fitting teeth 47. The oil channel 41 may be provided in each of adjacent ones of the center-side fitting teeth 47. The oil channels 41 are formed by pushing a core pin against the end surfaces 47T of the center-side fitting teeth 47 in the second direction D2 when the pressure plate 70 formed with a mold is detached from the mold, or are formed by cutting, for example. The oil channels 41 also define and function as channels that guide clutch oil flowing at the outer peripheral surface 45A of the outer peripheral wall 45 (i.e., clutch oil adhering to surfaces 47S of the center-side fitting teeth 47) to the inside of the clutch center 40. For example, when rotation of the clutch center 40 stops (e.g., when the engine stops), in the oil channels 41 located above the clutch center 40, clutch oil adhering to the surfaces 47S of the center-side fitting teeth 47 flows at the inner peripheral surface 45B of the clutch center 40 through the oil channels 41 by gravity. When rotation of the clutch center 40 stops, in the oil channels 41 located below the clutch center 40, clutch oil adhering to the inner peripheral surface 45B of the outer peripheral wall 45 of the center-side fitting teeth 47 flows at the surfaces 47S of the center-side fitting teeth 47 through the oil channels 41 by gravity. That is, while the clutch center 40 does not rotate, clutch oil can flow from the inside to outside of the clutch center 40 through the oil channels 41 and also flow from the outside to the inside of the clutch center 40 at the same time.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by a pressure-side fitting teeth 77 (see FIG. 4) described later of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Each of the center-side cam portions 60 preferably has a trapezoidal shape including a cam surface of a slope defining an assist & slipper (registered trademark) mechanism that generates an assist torque as a force to increase a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 project from the base wall 43 in the second direction D2. As illustrated in FIG. 3A, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 3A, the center-side cam portions 60 are located radially outward of the output shaft holding portion 50. Each of the center-side cam portions 60 includes the center-side assist cam surface 60A and the center-side slipper cam surface 60S. The center-side assist cam surface 60A is configured to generate a force in a direction from the pressure plate 70 toward the clutch center 40 in order to increase a pressing force (contact pressure force) between the input-side rotating plates 20 and the output-side rotating plates 22 in relative rotation to the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 in relative rotation to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S.

As illustrated in FIG. 2, the clutch center 40 includes the plurality of (for example, three in this preferred embodiment) bosses 54. The bosses 54 support the pressure plate 70. The plurality of bosses 54 are arranged at regular or substantially regular intervals in the circumferential directions S. Each of the bosses 54 has a cylindrical shape. The bosses 54 are located radially outward of the output shaft holding portion 50. The bosses 54 extend toward the pressure plate 70 (i.e., in the second direction D2). The bosses 54 are disposed on the base wall 43. The bosses 54 have screw holes 54H in which bolts 28 (see FIG. 1) are inserted. The screw holes 54H extend in the axial directions of the clutch center 40.

As illustrated in FIGS. 2 and 3A, the clutch center 40 includes center-side cam holes 43H penetrating a portion of the base wall 43. The center-side cam holes 43H penetrate the base wall 43 in the directions D. The center-side cam holes 43H extend from portions on the side of the output shaft holding portion 50 to the outer peripheral wall 45. Each of the center-side cam holes 43H is located between the center-side assist cam surface 60A of the center-side cam portion 60 and the boss 54. When seen in the axial direction of the clutch center 40, the center-side assist cam surface 60A overlaps with a portion of the center-side cam hole 43H.

As illustrated in FIGS. 2 and 3A, the clutch center 40 includes through holes 43P penetrating a portion of the base wall 43. The through holes 43P penetrate the base wall 43 in the directions D. Each of the through hole 43P is located between the center-side slipper cam surface 60S of the center-side cam portion 60 and the center-side cam hole 43H. The through holes 43P are located between the center-side slipper cam surface 60S of the center-side cam portions 60 and the bosses 54. The through hole 43P is located ahead of the center-side slipper cam surface 60S in the first circumferential direction S1. The through hole 43P is located ahead of the boss 54 in the second circumferential direction S2. The oil flow holes 49 are located radially outward of the through holes 43P. The through holes 43P are smaller than the center-side cam holes 43H. The through holes 43P causes the inside and outside of the clutch center 40 to communicate with each other. The through holes 43P are configured to guide clutch oil flowing outside the clutch center 40 to the inside of the clutch center 40. More specifically, as indicated by arrow FS in FIG. 1, clutch oil that has flowed out from the output shaft 15 toward the clutch center 40 flows into the clutch center 40 through the through holes 43P.

As illustrated in FIG. 2, the center-side fitting portion 58 is located radially outward of the output shaft holding portion 50. The center-side fitting portion 58 is located radially outward of the center-side cam portions 60. The center-side fitting portion 58 is disposed ahead of the center-side cam portions 60 in the second direction D2. The center-side fitting portion 58 is located on the inner peripheral surface of the outer peripheral wall 45. The center-side fitting portion 58 is slidably fitted onto a pressure-side fitting portion 88 (see FIG. 4) described later. The inner diameter of the center-side fitting portion 58 has a fitting tolerance allowing distribution of clutch oil flowing out of a distal end 15T of the output shaft 15 to the pressure-side fitting portion 88. That is, a gap is located between the center-side fitting portion 58 and the pressure-side fitting portion 88 described later. In this preferred embodiment, for example, the center-side fitting portion 58 has an inner diameter larger than the outer diameter of the pressure-side fitting portion 88 by about 0.1 mm. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is disposed coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The pressure plate 70 holds the plurality of output-side rotating plates 22 arranged alternately with the input-side rotating plates 20. The output-side rotating plates 22 are displaceable along the axial directions of the pressure plate 70. The output-side rotating plates 22 are rotatable together with pressure plate 70.

Figure 4:
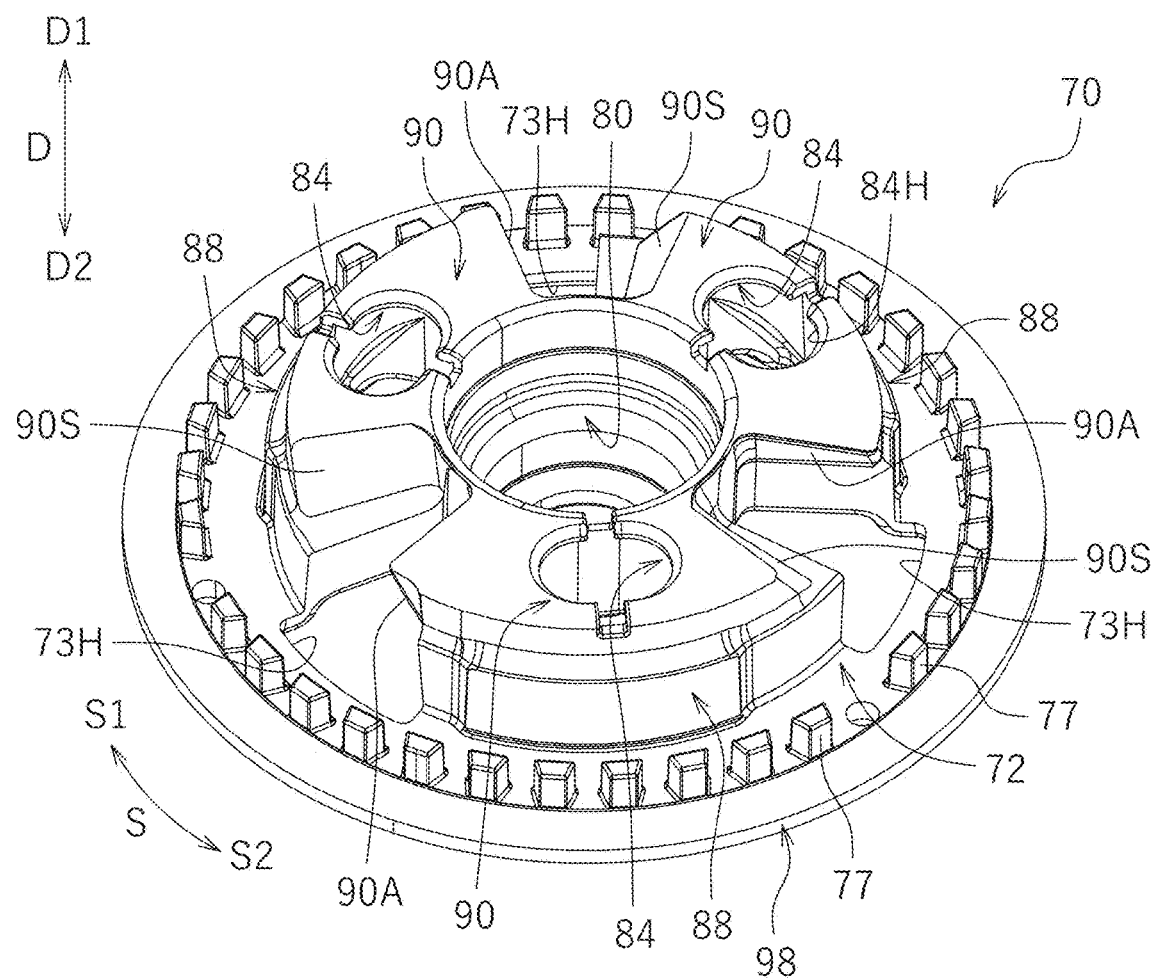
FIG. 4 is a perspective view of a pressure plate according to the first preferred embodiment of the present invention.
Figure 6:
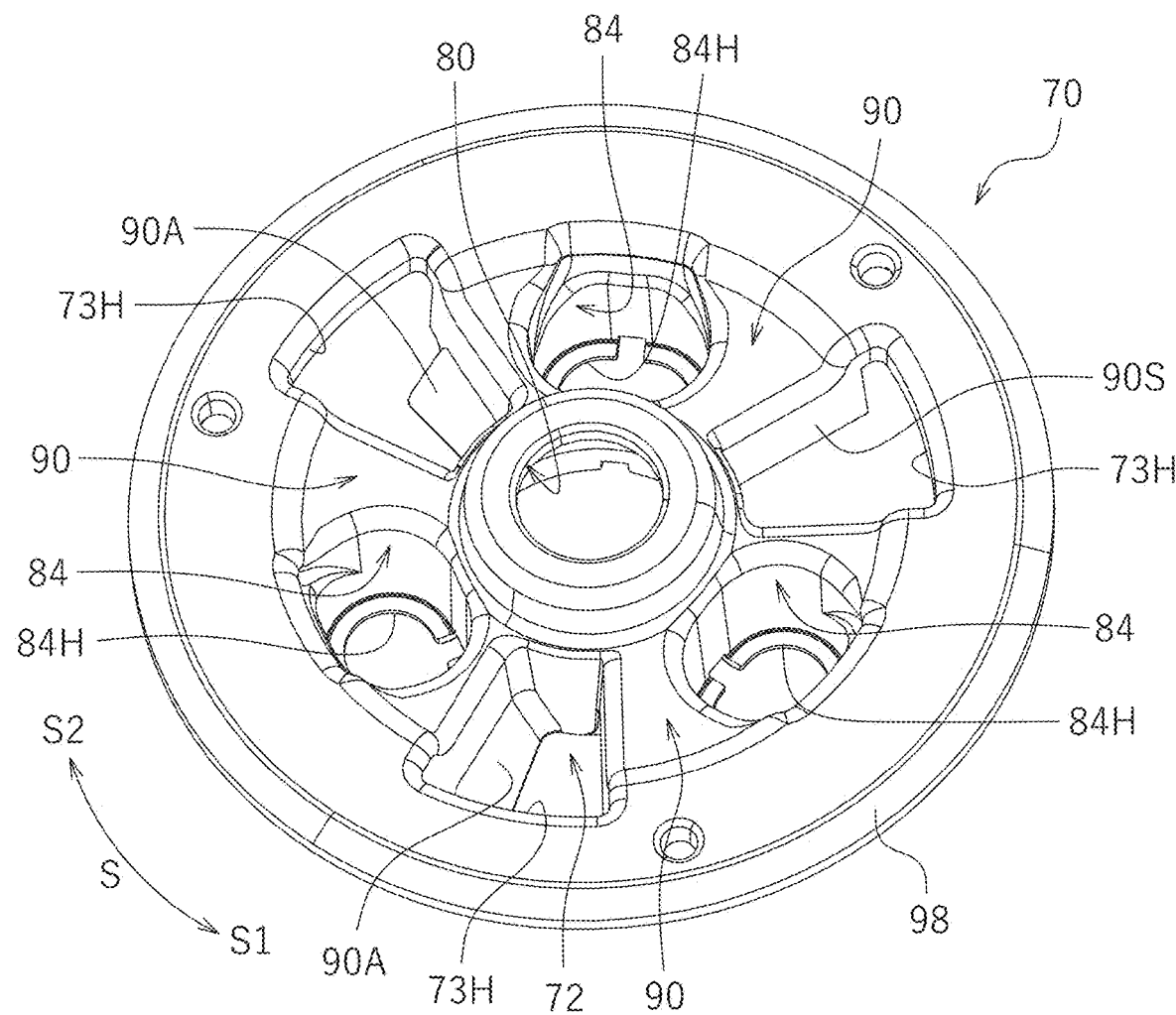
FIG. 6 is a perspective view of a pressure plate according to the first preferred embodiment of the present invention.

As illustrated in FIG. 4, the body 72 includes the cylindrical portion 80, the plurality of pressure-side cam portions 90, the pressure-side fitting portion 88, and a spring housing portion 84 (see also FIG. 6).

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil that has flowed out from the distal end 15T of the output shaft 15.

Figure 5:
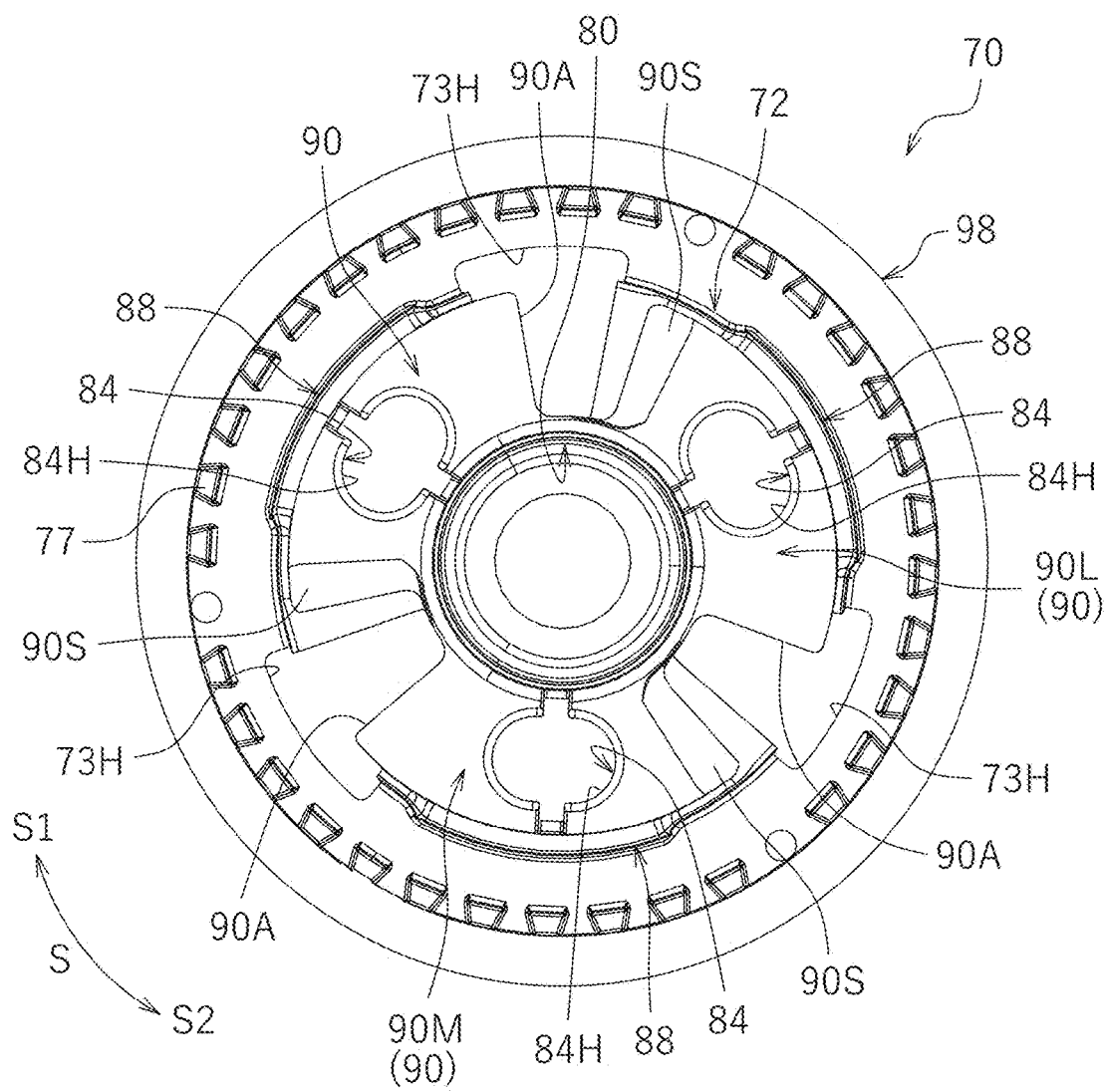
FIG. 5 is a plan view of a pressure plate according to the first preferred embodiment of the present invention.

Each of the pressure-side cam portions 90 preferably has a trapezoidal shape having a cam surface of a slope constituting an assist & slipper (registered trademark) mechanism that slides on the center-side cam portions 60 and generates an assist torque or a slipper torque. The pressure-side cam portions 90 project from the flange 98 in the first direction D1. As illustrated in FIG. 5, the pressure-side cam portions 90 are arranged at regular or substantially regular intervals in the circumferential directions S of the pressure plate 70. In this preferred embodiment, the pressure plate 70 includes three pressure-side cam portions 90, but the number of the pressure-side cam portions 90 is not limited to three.

As illustrated in FIG. 5, the pressure-side cam portion 90 is located radially outward of the cylindrical portion 80. Each of the pressure-side cam portions 90 includes a pressure-side assist cam surface 90A (see also FIG. 7) and a pressure-side slipper cam surface 90S. The pressure-side assist cam surface 90A can be brought into contact with the center-side assist cam surface 60A. The pressure-side assist cam surface 90A is configured to generate a force in a direction from the pressure plate 70 toward the clutch center 40 in order to increase a pressing force (contact pressure force) between the input-side rotating plates 20 and the output-side rotating plates 22 in relative rotation to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 in relative rotation to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 9A:
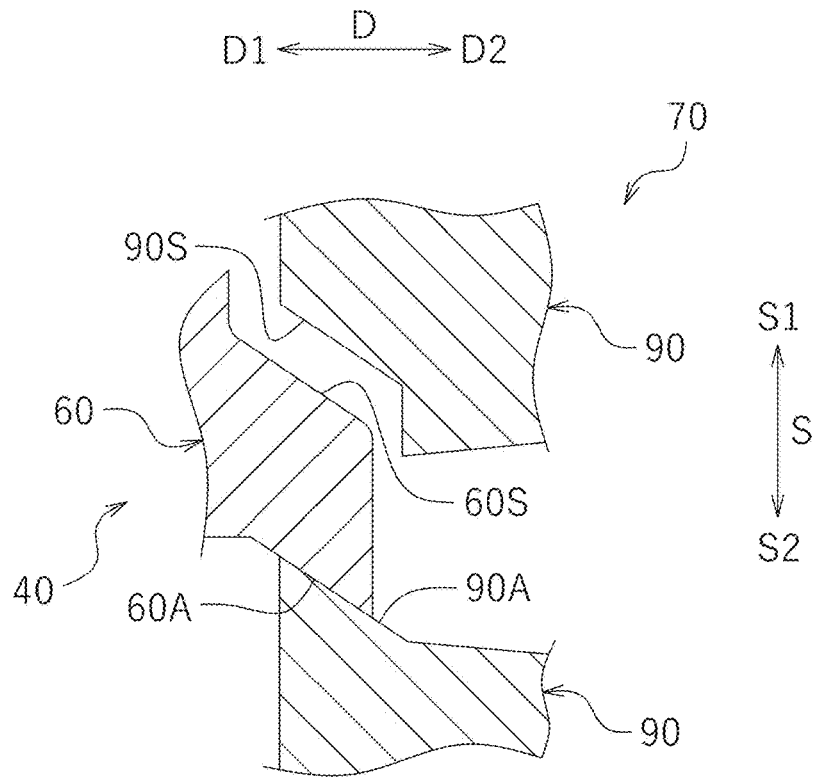
FIG. 9A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is allowed to be transferred to the output shaft 15 through the clutch center 40, a rotation force in the first circumferential direction S1 is applied to the pressure plate 70, as illustrated in FIG. 9A. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases.

Figure 9B:
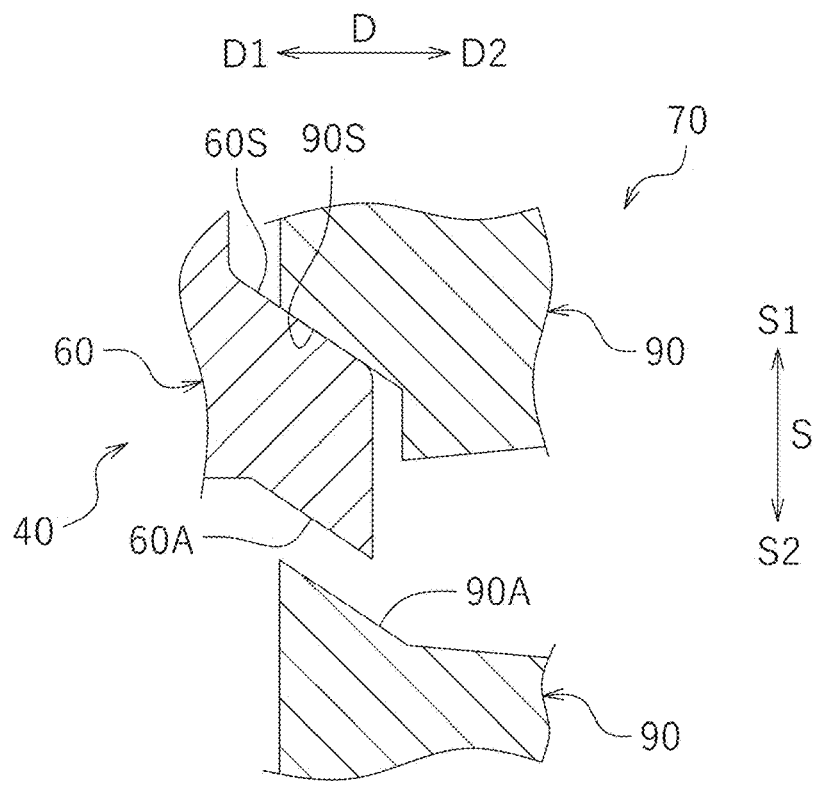
FIG. 9B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 9B. Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque.

Figure 7:
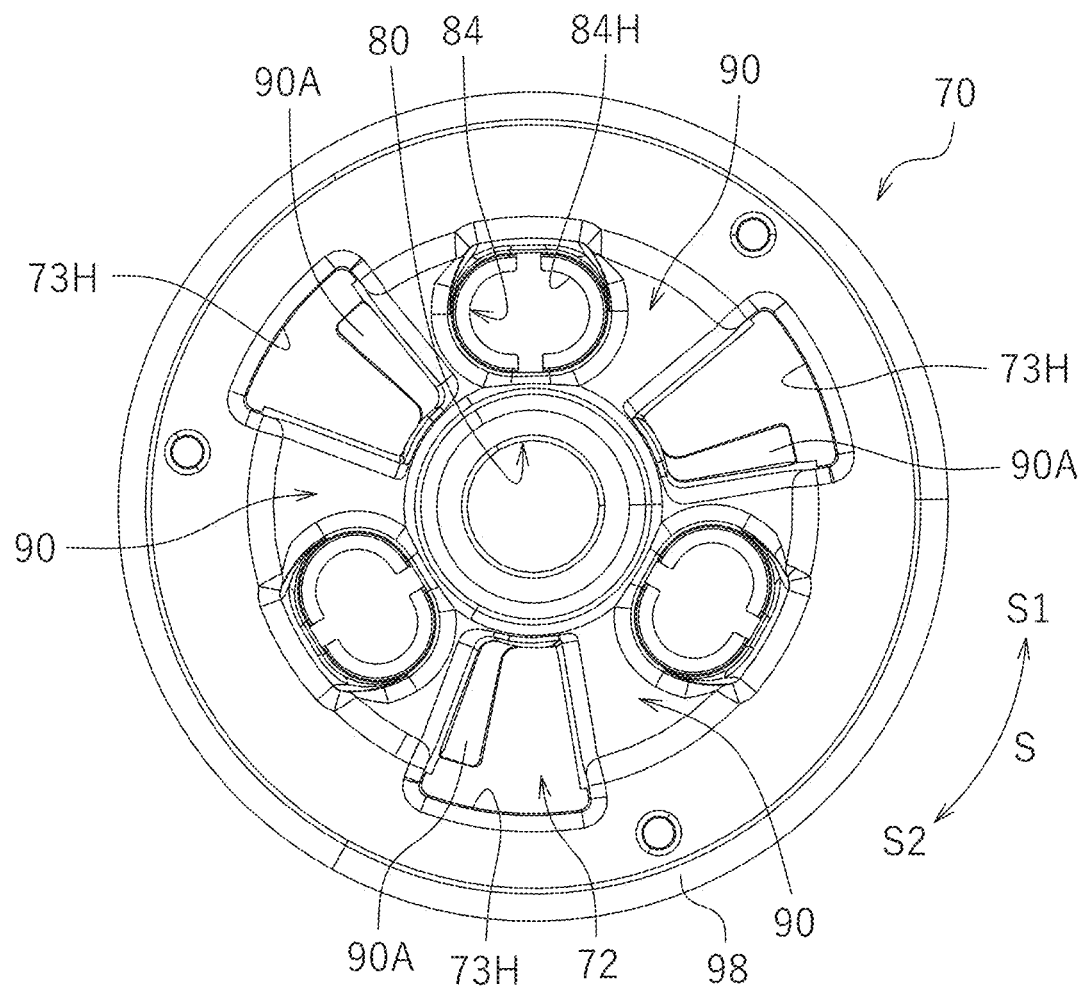
FIG. 7 is a plan view of a pressure plate according to the first preferred embodiment of the present invention.

As illustrated in FIGS. 4 and 5, the pressure plate 70 has pressure-side cam holes 73H penetrating the body 72 and a portion of the flange 98. The pressure-side cam holes 73H are located radially outward of the cylindrical portion 80. The pressure-side cam holes 73H extend from portions on the side of the cylindrical portion 80 to the radially outside of the pressure-side fitting portion 88. Each of the pressure-side cam holes 73H is located between adjacent ones of the pressure-side cam portions 90. Each of the pressure-side cam holes 73H is located between the pressure-side assist cam surface 90A and the pressure-side slipper cam surface 90S of adjacent ones of the pressure-side cam portions 90. As illustrated in FIGS. 5 and 7, when seen in the axial direction of the pressure plate 70, the pressure-side assist cam surface 90A overlaps with portions of the pressure-side cam holes 73H.

As illustrated in FIGS. 6 and 7, the spring housing portions 84 are located in the pressure-side cam portions 90. The spring housing portions 84 are recessed from the second direction D2 in the first direction D1. Each of the spring housing portions 84 has an oval shape. The spring housing portions 84 house pressure springs 25 (see FIG. 1). The spring housing portions 84 include insertion holes 84H which penetrate the spring housing portions 84 and in which the bosses 54 (see FIG. 2) are inserted. That is, the insertion holes 84H penetrate the pressure-side cam portions 90. Each of the insertion holes 84H has an oval shape.

As illustrated in FIG. 1, the pressure springs 25 are housed in the spring housing portions 84. The pressure springs 25 are held by the bosses 54 inserted in the insertion holes 84H of the spring housing portions 84. The pressure springs 25 bias the pressure plate 70 toward the clutch center 40 (i.e., in the first direction D1). The pressure springs 25 are, for example, coil springs obtained by radially winding spring stee.

As illustrated in FIG. 4, the pressure-side fitting portion 88 is provided in the body 72. The pressure-side fitting portion 88 is located ahead of the pressure-side cam portions 90 in the second direction D2. The pressure-side fitting portion 88 is configured to slidably fit in the center-side fitting portion 58 (see FIG. 2).

As illustrated in FIG. 4, the pressure plate 70 includes the plurality of pressure-side fitting teeth 77 disposed on the flange 98. The pressure-side fitting teeth 77 hold the output-side rotating plates 22. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The pressure-side fitting teeth 77 are provided on the fitting tooth surface 98B of the flange 98. The pressure-side fitting teeth 77 project in the first direction D1 from the fitting tooth surface 98B. The pressure-side fitting teeth 77 are arranged in the circumferential directions S. In this preferred embodiment, since a portion of the pressure-side fitting teeth 77 has been removed, the interval of this portion is enlarged, but the other adjacent pressure-side fitting teeth 77 are arranged at regular or substantially regular intervals.

Figure 8:
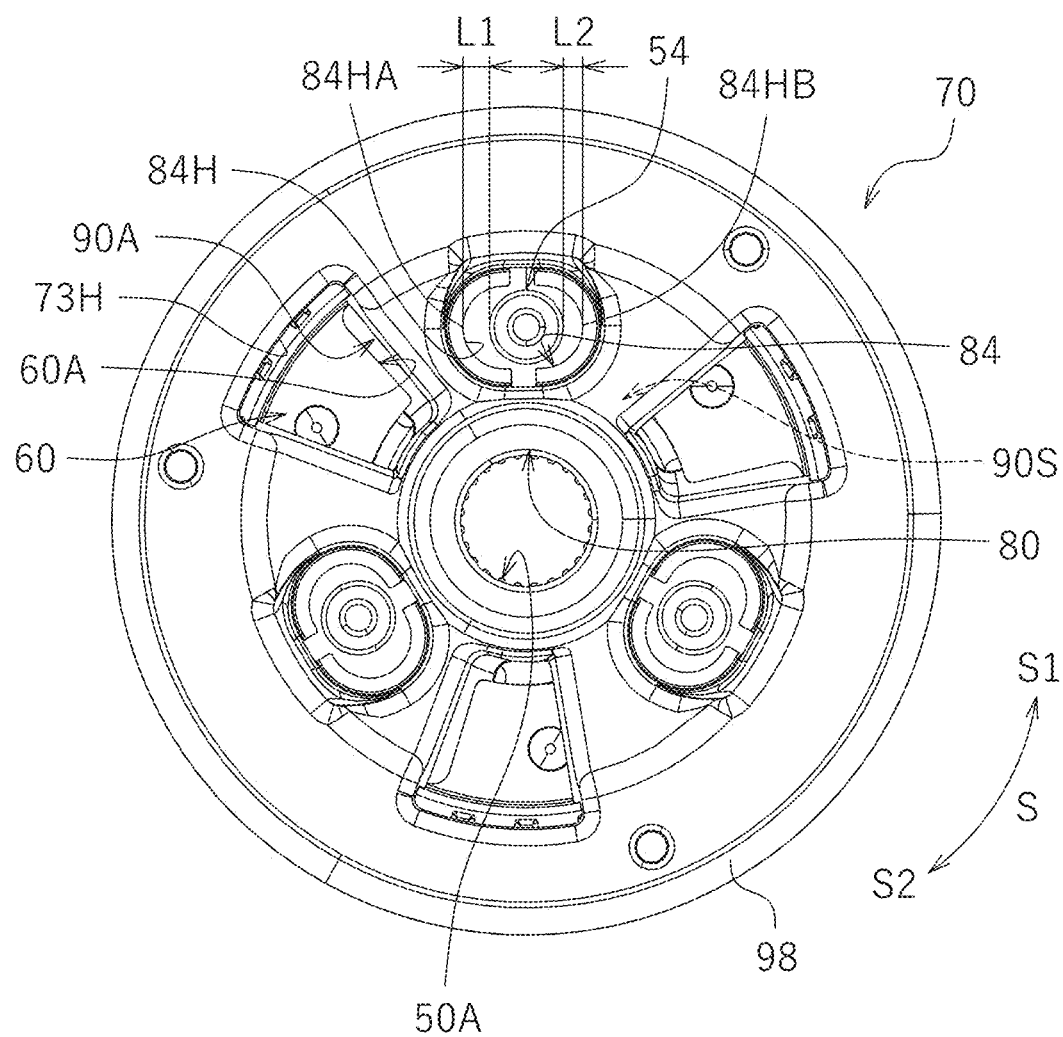
FIG. 8 is a plan view illustrating a state where a clutch center according to the first preferred embodiment of the present invention and a pressure plate are combined.

FIG. 8 is a plan view illustrating a state where the clutch center 40 and the pressure plate 70 are combined. In the state illustrated in FIG. 8, the pressure-side assist cam surface 90A and the center-side assist cam surface 60A do not contact each other, and the pressure-side slipper cam surface 90S and the center-side slipper cam surface 60S do not contact each other. At this time, the pressure plate 70 is closest to the clutch center 40. In the state illustrated in FIG. 8 (in the state of assembly), a distance L1 in the circumferential directions S between the boss 54 and an end 84HA of the insertion holes 84H toward the pressure-side assist cam surface 90A (i.e., ahead in the first circumferential direction S1) in the normal state is smaller than a distance L2 in the circumferential direction S between the boss 54 and an end 84HB of the insertion holes 84H toward the pressure-side slipper cam surface 90S (i.e., ahead in the second circumferential direction S2) in the normal state.

As illustrated in FIG. 1, the stopper plate 100 can contact the pressure plate 70. The stopper plate 100 reduces or prevents separation of the pressure plate 70 from the clutch center 40 by a predetermined distance or more in the second direction D2. The stopper plate 100 is fixed to the bosses 54 of the clutch center 40 with the bolts 28. The pressure plate 70 is fixed by fastening the bolts 28 to the bosses 54 through the stopper plate 100 with the bosses 54 and the pressure springs 25 of the clutch center 40 disposed in the spring housing portions 84. The stopper plate 100 is substantially triangular in plan view.

When the pressure plate 70 is brought into contact with the stopper plate 100, the pressure-side slipper cam surface 90S and the center-side slipper cam surface 60S are in contact with each other in an area of about 50% or more and about 90% or less of the area of the pressure-side slipper cam surface 90S and about 50% or more and about 90% or less of the area of the center-side slipper cam surface 60S, for example. When the pressure plate 70 is brought into contact with the stopper plate 100, the pressure springs 25 are separated from the side walls of the spring housing portions 84. That is, the pressure springs 25 are not sandwiched between the bosses 54 and the spring housing portions 84, and application of excessive stress to the bosses 54 is reduced or prevented.

The clutch device 10 is filled with a predetermined amount of clutch oil. Clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and the oil flow holes 49. Clutch oil flowing at the inner peripheral surface 45B of the outer peripheral wall 45 of the clutch center 40 is discharged to the outside of the clutch center 45B through the oil channels 41, as indicated by arrow FM in FIG. 3A. Clutch oil also flows from the outside of the clutch center 43H through the hollow portion 15H of the output shaft 15 and is distributed in the clutch center 40 through the center-side cam holes 43H and the through holes 43P. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is disposed between the engine and the transmission of the motorcycle, and allows or interrupts transfer of a rotation driving force of the engine to the transmission by driver's operation of a clutch operation lever.

In the clutch device 10, in a case where the driver of the motorcycle does not operate the clutch operation lever, a clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, clutch oil distributed in the hollow portion 15H of the output shaft 15 and having flowed out from the distal end 15T of the output shaft 15 is dropped or spattered in the cylindrical portion 80 and attached to the cylindrical portion 80 (see arrow F in FIG. 1). The clutch oil attached to the inside of the cylindrical portion 80 is guided into the clutch center 40. Accordingly, clutch oil flows out of the clutch center 40 through the oil flow holes 49. Clutch oil also flows out of the clutch center 40 through the oil channels 41 and the gap between the center-side fitting portion 58 and the pressure-side fitting portion 88. Then, clutch oil that has flowed out of the clutch center 40 is supplied to the input-side rotating plates 20 and the output-side rotating plates 22.

On the other hand, in the clutch device 10, when the driver of the motorcycle operates the clutch operation lever in the clutch-ON state, the clutch release mechanism (not shown) presses the push rod 16A, and thus, the pressure plate 70 is displaced in a direction away from the clutch center 40 (second direction D2) against a biasing force of the pressure springs 25. Accordingly, the clutch center 40 enters a clutch-OFF state in which friction coupling between the input-side rotating plates 20 and the output-side rotating plates 22 is canceled, and thus, rotational driving attenuates or stops. That is, a rotation driving force of the engine is interrupted to the clutch center 40.

In the clutch-OFF state, clutch oil distributed in the hollow portion 15H of the output shaft 15 and having flowed out of the distal end 15T of the output shaft 15 is guided into the clutch center 40 in the same or substantially the same manner as in the clutch-ON state. At this time, since the pressure plate 70 is separated from the clutch center 40, the amount of fitting between the pressure plate 70 and each of the center-side fitting portion 58 and the pressure-side fitting portion 88 decreases. As a result, clutch oil in the cylindrical portion 80 actively flows out of the clutch center 40, and is distributed to portions in the clutch device 10. In particular, clutch oil can be actively guided to gaps between the input-side rotating plates 20 and the output-side rotating plates 22 separated from each other.

Then, when the driver cancels the clutch operation lever in the clutch-OFF state, pressing of the pressure plate 70 by the clutch release mechanism (not shown) through the push member 16B is canceled, and thus, the pressure plate 70 is displaced with a biasing force of the pressure springs 25 to a direction (first direction D1) of approaching the clutch center 40.

As described above, in the clutch device 10 according to this preferred embodiment, the oil channels 41 of the clutch center 40 are located in the end portions 47E of the center-side fitting teeth 47 in the second direction D2, and allow clutch oil flowing at least at the inner peripheral surface 45B of the outer peripheral wall 45 to be discharged to the outside of the clutch center 40. Accordingly, a larger amount of clutch oil flowing between the clutch center 40 and the pressure plate 70 flows to the outside of the clutch center 40 through the oil channels 41. That is, since a larger amount of clutch oil flows from the inside of the clutch center 40, clutch oil can be efficiently supplied to the input-side rotating plates 20 and the output-side rotating plates 22 located outward of the center-side fitting teeth 47.

In the clutch device 10 according to this preferred embodiment, the oil channels 41 are recessed grooves that are recessed in the first direction D1 from the end surfaces 47T of the center-side fitting teeth 47 in the second direction D2. In this configuration, a larger amount of clutch oil in the clutch center 40 is allowed to flow to the outside with a relatively simple structure.

In the clutch device 10 according to this preferred embodiment, the clutch center 40 includes the plurality of center-side cam portions 60 located radially outward of the output shaft holding portion 50 and each including at least one of the center-side assist cam surface 60A operable to generate a force in a direction from the pressure plate 70 toward the clutch center 40 in order to increase a pressing force between the input-side rotating plates 20 and the output-side rotating plates 22 upon rotation relative to the pressure plate 70 and the center-side slipper cam surface 60S operable to cause the pressure plate 70 to move away from the clutch center 40 in order to reduce the pressing force between the input-side rotating plates 20 and the output-side rotating plates 22 upon rotation relative to the pressure plate 70, and the oil channels 41 are located radially outward of the center-side cam portions 60. Clutch oil tends to be accumulated around the center-side cam portions 60 while the clutch center 40 rotates, and thus, the oil channels 41 arranged radially outward of the center-side cam portions 60 can cause the accumulated clutch oil to effectively flow to the outside from the oil channels 41. Accordingly, a larger amount of clutch oil is caused to flow to the outside of the clutch center 40.

In the clutch device 10 according to this preferred embodiment, the oil channels 41 are arranged radially outward of the through holes 43P. Since clutch oil flows into the through holes 43P from the outside of the clutch center 40, the oil channels 41 arranged radially outward of the through holes 43P cause the clutch oil to effectively flow to the outside (i.e., toward the input-side rotating plates 20 and the output-side rotating plates 22) from the oil channels 41. Accordingly, a larger amount of clutch oil is caused to flow to the input-side rotating plates 20 and the output-side rotating plates 22.

In the clutch device 10 according to this preferred embodiment, the clutch center 40 includes the center-side fitting portion 58 disposed in the inner peripheral surface 45B of the outer peripheral wall 45, the pressure plate 70 includes the pressure-side fitting portion 88 slidably fitted in the center-side fitting portion 58, and the oil channels 41 are arranged at positions facing the pressure-side fitting portion 88. In this configuration, a larger amount of clutch oil in the clutch center 40 can be caused to flow to a portion between the center-side fitting portion 58 and the pressure-side fitting portion 88 through the oil channels 41. Accordingly, a larger amount of clutch oil can be caused to flow to the outside of the clutch center 40 with sliding resistance between the center-side fitting portion 58 and the pressure-side fitting portion 88 reduced.

In the clutch device 10 according to this preferred embodiment, the center-side fitting tooth 47C including no oil channels 41 is disposed between one center-side fitting tooth 47A including the oil channel 41 and another center-side fitting tooth 47B including the oil channel 41. With this configuration, clutch oil can be caused to flow to the outside of the clutch center 40 in a balanced manner.

The foregoing description is directed to the preferred embodiments of the present disclosure. The preferred embodiments described above, however, are merely examples, and the present disclosure can be performed in various modes and through various preferred embodiments.

In the preferred embodiments described above, each of the center-side cam portions 60 includes the center-side assist cam surface 60A and the center-side slipper cam surface 60S, but it is possible to only include at least one of the center-side assist cam surface 60A or the center-side slipper cam surface 60S.

In the preferred embodiments described above, each of the pressure-side cam portions 90 includes the pressure-side assist cam surface 90A and the pressure-side slipper cam surface 90S, but it is possible to only include at least one of the pressure-side assist cam surface 90A or the pressure-side slipper cam surface 90S.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or interrupt transfer of a rotation driving force of an input shaft to an output shaft, the clutch device comprising:
    a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged; and
    a pressure plate movable toward or away from the clutch center and rotatable relative to the clutch center, the pressure plate being operable to press the input-side rotating plates and the output-side rotating plates; wherein
    the clutch center includes:
        an output shaft holding portion to which the output shaft is coupled;
        an outer peripheral wall located radially outward of the output shaft holding portion;
        a plurality of center-side fitting teeth holding the output-side rotating plates, projecting radially outward from an outer peripheral surface of the outer peripheral wall, and arranged in circumferential directions; and
        an oil channel located in an end surface of at least one of the center-side fitting teeth in a second direction, a direction in which the pressure plate moves toward the clutch center being a first direction, a direction in which the pressure plate moves away from the clutch center being the second direction; and
    the oil channel allows clutch oil flowing at least at an inner peripheral surface of the outer peripheral wall to be discharged to outside of the clutch center.

2. The clutch device according to claim 1, wherein the oil channel includes a recessed groove that is recessed in the first direction from an end surface of at least one of the center-side fitting teeth in the second direction.

3. The clutch device according to claim 1, wherein the clutch center includes:
    a plurality of center-side cam portions located radially outward of the output shaft holding portion and each including at least one of a center-side assist cam surface or a center-side slipper cam surface, the center-side assist cam surface being operable to generate a force in a direction from the pressure plate toward the clutch center in order to increase a pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate; and
    the oil channel is located radially outward of one of the center-side cam portions.

4. The clutch device according to claim 1, wherein the clutch center includes:
    a plurality of center-side cam portions located radially outward of the output shaft holding portion and each including at least one of a center-side assist cam surface or a center-side slipper cam surface, the center-side assist cam surface being operable to generate a force in a direction from the pressure plate toward the clutch center in order to increase the pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate; and
    a through hole between adjacent ones of the center-side cam portions; and
    the oil channel is located radially outward of the through hole.

5. The clutch device according to claim 1, wherein
    the clutch center includes a center-side fitting portion located on an inner peripheral surface of the outer peripheral wall;
    the pressure plate includes a pressure-side fitting portion slidably fitted in the center-side fitting portion; and
    the oil channel is located at a position facing the pressure-side fitting portion.

6. The clutch device according to claim 1, wherein the center-side fitting teeth include a center-side fitting tooth including no oil channel and located between one of the center-side fitting teeth including the oil channel and another of the center-side fitting teeth including the oil channel.

7. A motorcycle comprising the clutch device according to claim 1.

8. A clutch device to allow or interrupt transfer of a rotation driving force of an input shaft to an output shaft, the clutch device comprising:
    a clutch center housed in a clutch housing holding a plurality of input-side rotating plates to be rotationally driven by rotational driving of the input shaft, the clutch center holding a plurality of output-side rotating plates and being operable to be rotationally driven together with the output shaft, the input-side rotating plates and the output-side rotating plates being alternately arranged; and a pressure plate movable toward or away from the clutch center and rotatable relative to the clutch center, the pressure plate being operable to press the input-side rotating plates and the output-side rotating plates; wherein the clutch center includes:
- an output shaft holding portion to which the output shaft is coupled;
- an outer peripheral wall located radially outward of the output shaft holding portion;
- a plurality of center-side fitting teeth holding the output-side rotating plates, projecting radially outward from an outer peripheral surface of the outer peripheral wall, and arranged in circumferential directions; and
- a recess that is recessed in a first direction from an end surface of at least one of the center-side fitting teeth in a second direction, a direction in which the pressure plate moves toward the clutch center being a first direction, a direction in which the pressure plate moves away from the clutch center being the second direction; and the recess is open toward an inner peripheral surface and the outer peripheral surface of the outer peripheral wall.

* * * * *